US010764655B2

(12) United States Patent
Vermolen et al.

(10) Patent No.: US 10,764,655 B2
(45) Date of Patent: Sep. 1, 2020

(54) MAIN AND IMMERSIVE VIDEO COORDINATION SYSTEM AND METHOD

(71) Applicant: NBCUniversal Media, LLC, New York, NY (US)

(72) Inventors: Arturo Vermolen, New York, NY (US); Sheau Ng, Wayland, MA (US)

(73) Assignee: NBCUniversal Media, LLC, New York, NY (US)

( * ) Notice: Subject to any disclaimer, the term of this patent is extended or adjusted under 35 U.S.C. 154(b) by 1062 days.

(21) Appl. No.: 14/463,138

(22) Filed: Aug. 19, 2014

(65) Prior Publication Data
US 2015/0289032 A1 Oct. 8, 2015

Related U.S. Application Data
(60) Provisional application No. 61/974,890, filed on Apr. 3, 2014.

(51) Int. Cl.
| | |
|---|---|
| *H04N 21/854* | (2011.01) |
| *H04N 21/2225* | (2011.01) |
| *H04N 21/234* | (2011.01) |
| *H04N 21/239* | (2011.01) |
| *H04N 21/414* | (2011.01) |
| *H04N 21/437* | (2011.01) |
| *H04N 21/44* | (2011.01) |
| *H04N 21/472* | (2011.01) |
| *H04N 21/81* | (2011.01) |
| *H04N 21/242* | (2011.01) |

(Continued)

(52) U.S. Cl.
CPC ....... *H04N 21/854* (2013.01); *H04N 21/2225* (2013.01); *H04N 21/233* (2013.01); *H04N 21/2393* (2013.01); *H04N 21/23418* (2013.01); *H04N 21/23424* (2013.01); *H04N 21/242* (2013.01); *H04N 21/41407* (2013.01); *H04N 21/4307* (2013.01); *H04N 21/437* (2013.01); *H04N 21/44* (2013.01); *H04N 21/4622* (2013.01); *H04N 21/47202* (2013.01); *H04N 21/6587* (2013.01); *H04N 21/816* (2013.01)

(58) Field of Classification Search
CPC ....... H04N 21/21805; H04N 21/23424; H04N 21/44016
See application file for complete search history.

(56) References Cited

U.S. PATENT DOCUMENTS

| | | | | |
|---|---|---|---|---|
| 7,671,893 | B2 * | 3/2010 | Li | H04N 21/21805 725/105 |
| 2002/0147991 | A1 * | 10/2002 | Furlan | H04N 21/44027 725/135 |

(Continued)

*Primary Examiner* — Pankaj Kumar
*Assistant Examiner* — Alexander Boyd
(74) *Attorney, Agent, or Firm* — Fletcher Yoder, P.C.

(57) ABSTRACT

Standard video (and audio) data are combined or blended with immersive video (and audio) data. The data may be collected together, and the standard video views may be a default or reflect a primary view or scene for certain content. The immersive video views may be adjacent or around the primary view, and are available for viewing based upon audience input. The data are blended temporally and spatially to synchronize and align them for virtually seamless transition between the standard video view and the immersive video views. Blending may be performed before distribution, after distribution, or some combination of these.

27 Claims, 4 Drawing Sheets

(51) Int. Cl.
*H04N 21/43* (2011.01)
*H04N 21/6587* (2011.01)
*H04N 21/233* (2011.01)
*H04N 21/462* (2011.01)

(56) References Cited

U.S. PATENT DOCUMENTS

| | | | | |
|---|---|---|---|---|
| 2003/0026588 | A1* | 2/2003 | Elder | G08B 13/19643 386/230 |
| 2005/0062869 | A1* | 3/2005 | Zimmermann | H04N 21/47211 348/335 |
| 2009/0289937 | A1* | 11/2009 | Flake | G06T 17/05 345/419 |
| 2010/0299630 | A1* | 11/2010 | McCutchen | H04N 7/18 715/803 |
| 2012/0002949 | A1* | 1/2012 | Matsuura | H04N 21/42646 386/248 |
| 2012/0092348 | A1* | 4/2012 | McCutchen | G06T 3/00 345/474 |
| 2012/0149432 | A1* | 6/2012 | Lablans | H04N 5/775 348/36 |
| 2013/0278828 | A1* | 10/2013 | Todd | H04N 21/21805 348/564 |
| 2014/0270706 | A1* | 9/2014 | Pasko | H04N 21/21805 386/278 |
| 2015/0016661 | A1* | 1/2015 | Lord | H04N 21/42203 382/100 |
| 2015/0022557 | A1* | 1/2015 | Austin | H04N 21/21805 345/649 |

* cited by examiner

MAIN AND IMMERSIVE VIDEO COORDINATION SYSTEM AND METHOD

CROSS-REFERENCE TO RELATED APPLICATIONS

This application claims priority of U.S. Provisional Patent Application No. 61/974,890, filed Apr. 3, 2014, which is herein incorporated in its entirety by reference.

BACKGROUND

The present invention relates generally to video technologies, and particularly to techniques for blending and coordinating standard video content with immersive video content.

Various technologies have been developed for many years to capture moving picture scenes, to store them, and to play them back for audiences. Early and well-established technologies involve film exposure, processing and editing. Film was and is typically "shot" to capture desired scenes which appear on individual frames that can be played at desired rates to provide the appearance of movement within the scenes. Other technologies involve electronic and digital capture of scenes to produce raw data that is processed and stored on various supports and in various forms. The data is often encoded by algorithms often referred to as "codecs". Technologies such as videotape are also commonly used in parallel with the more historic and more recent technologies. In many contexts, film and video taped content may be converted do digital data for ease of processing, distribution, storage, and playback.

In general, conventional video content is captured by a camera of some sort, and stored. Processing of the video may involve determination of what scenes are of interest, piecing these scenes together, splicing out material that is not desired, selecting all or a portion of the field of view captured, and so forth. Video data is commonly paired with audio signals to provide voice, music, sound effects, and so forth. More recently, various computer assisted or animated segments may be incorporated. In general, all of these techniques typically provided a single view point that was presented to the audience during the viewing experience.

More recently, techniques have been developed for what may be termed "immersive video" (IV). In these techniques, a number of cameras are used to capture various points of view during a scene. The video may then be combined from the cameras to provide viewing points of view that may be seamlessly stitched to allow a viewing audience to pan or move the desired view. The result is an experience in which the viewer is more "immersed" in the scene. Such scenes may be accompanied by audio as with standard video content. Movement or selection of the views may be done in a number of manners, such as via an interactive input device, movement of a hand-held device (e.g., a cellular telephone) and so forth.

To date, little or no progress has been made in combining standard video content with IV content. Because both forms of content will likely be of interest, there may be a need for systems and methods for combining them to enhance the audience experience.

BRIEF DESCRIPTION

The present invention provides a method for combining standard video content with IV content designed to respond to such needs. The methods and systems disclosed may be used in a range of settings, including for distribution via mass audience of viewing (e.g., in theaters), television viewing, and viewing on wide range of personal devices, such as computers, hand-held devices, tablets, wearable devices such as goggles, glasses, heads-up displays, and so forth. Combination and processing of the video content may be performed remote from the display device, or may be at least partially performed on the display device. In some scenarios, "movement" commands from the audience may be sent to a service provider, such as via the cloud and combination/blending/processing is performed on the server-side or in the cloud with the client display only rendering the video. The resulting techniques allow for a rich and diversified experience, while allowing for the use of and combination with conventional standard video techniques.

In accordance with certain aspects of the disclosure, a method comprises accessing a standard video view, and accessing a corresponding immersive video view. At least a portion of the standard video view is displayed for an audience playback system, and an audience request is received for at least a portion of the immersive video view. Based on the request, the requested view is displayed.

In accordance with another embodiment, a method comprises accessing a standard video view, accessing a corresponding immersive video view, blending the standard video view and the immersive video view, and storing, distributing, and displaying the blended standard and immersive video views.

The disclosure also provides a system that comprises data storage storing a standard video view and a corresponding immersive video view, and a processing system configured to access the standard and immersive video views, and to blend the standard and immersive video views. A distribution system is configured to distribute the standard and immersive video views either before or after blending for viewing by an audience.

Still further, the disclosure provides a video file that comprises a standard video component comprising a primary view for desired content that may be rendered on an audience playback device, and an immersive video component comprising immersive views that at least partially surround the primary view.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
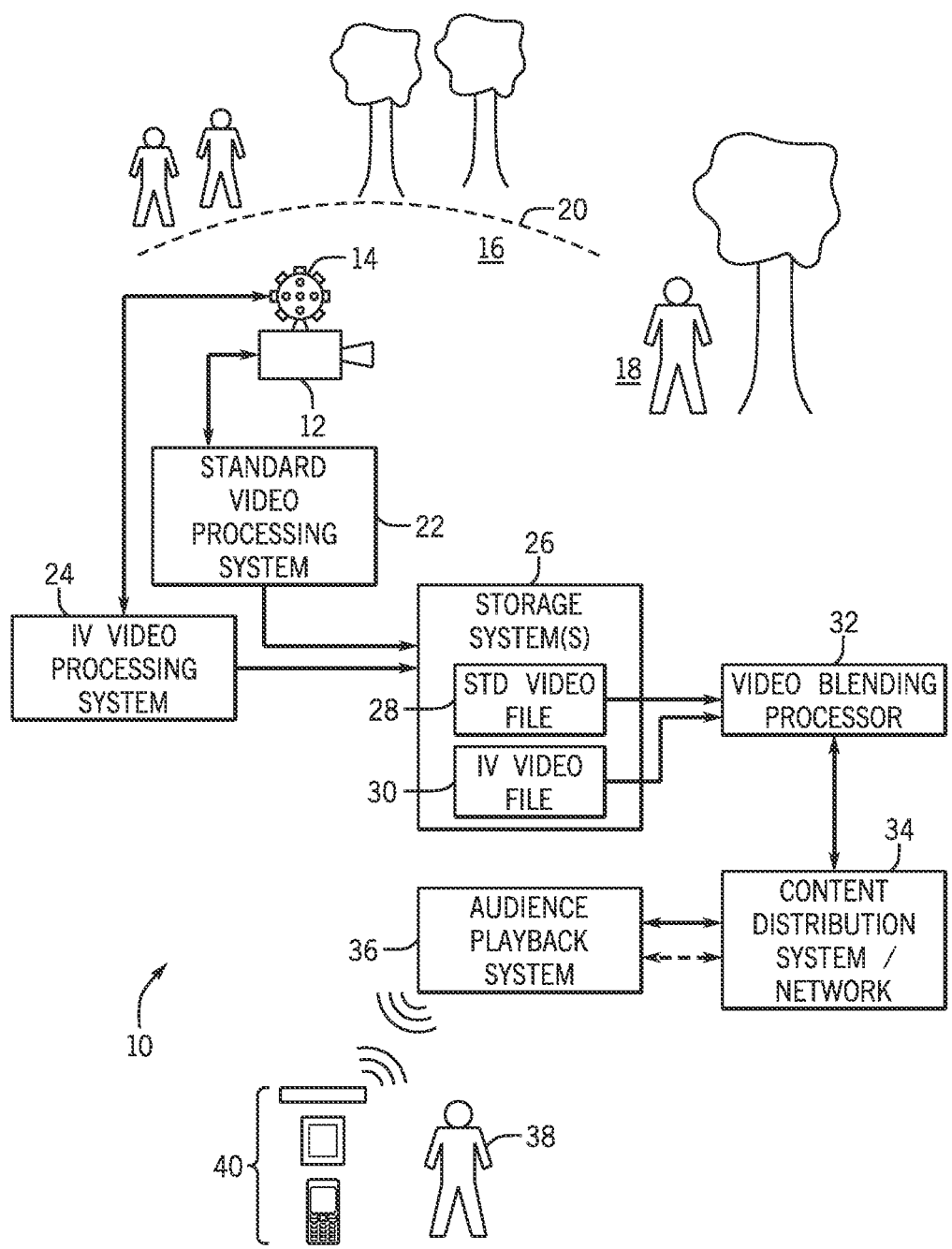
FIG. 1 is a diagrammatical representation of a media system that combines standard and IV content in accordance with aspects of the present techniques.

FIG. 1 illustrates an exemplary media system 10 that embodies aspects of the new techniques discussed below. The system allows for the capture, blending, storage and distribution of standard video and data. In the illustration of FIG. 1 the standard video is captured by a standard video camera 12, while the IV data is captured by an IV camera 14. The cameras may be associated with one another physically as generally illustrated diagrammatically in the figure. Various fixtures, mountings, and the like may be developed for this purpose. In general, the technologies implemented by the cameras may be conventional, and will include either film, tape or, in many cases digital capture circuitry. In certain cases, the cameras may use different technologies, such as either film or tape for the standard video capture, or increasingly direct digital capture, with electronic circuitry used for the IV data capture.

The cameras will typically capture the same or related scenes as indicated generally by reference numeral 16. The global scene will in most cases include a primary view 18 which may be selected by the operator of the camera, in accordance with conventional production decisions, workflows, and so forth. A surrounding view, however, will be captured by the IV camera, and this will typically include the principle view 18 as well as adjacent views, beside, above, below, both adjacent to and around the principle view. Indeed, in some cases the IV view may view almost or essentially a 360° view in which the principle view is merely a part (here "360°" may include a "flat", pan-type view, or essentially a spherical or nearly complete spherical view).

Data from the cameras is conveyed to processing systems, including a standard video processing system 22 for the standard video camera and an IV data processing system 24 for the IV camera. It should be appreciated that the processing systems will typically include one or more programmed computers, that themselves include digital processors, supporting memory, programs for processing the video data, codecs for encoding the data, processing algorithms for handling audio signals captured by or in association with the cameras, and so forth. The processing systems may allow for compressing of the video and/or audio data, as well as post-processing, such as to select scenes, crop scenes, applied pan and scan techniques, alter scenes, superimposed or combined scenes with computer animated content and supplemental content, and so forth. Ultimately, the standard and IV data processing systems will produce data that may be stored in one or more storage systems as indicated by reference numeral 26. The storage system itself may combine or separately store video files for the standard video data and the IV data indicated by reference numerals 28 and 30 respectively. These files may be in similar or different formats and will typically be different sizes, include selected views or simply surround or immersive views, include or correspond to audio files, and so forth. It is also contemplated that file formats may include a master/mezzanine file or "playlist" pointing to the related IV and standard video associated in every segment of the timeline. In such cases, such files may indicate metadata and encoding characteristics for both video types. As discussed in greater detail below, the standard video file 28 and the IV file 30 will be further processed to blend the video views, or more generally the content, in a processing system as indicated by reference numeral 32. The blending will allow for matching corresponding scenes in the standard and immersive video such that standard and IV views can be correlated and presented to users in a generally seamless manner. The blending will thus typically both temporally and spatially match, synchronize and align the views of both videos. It should be noted, however, that while the IV file may generally include points of view that correspond to the standard video file, the standard video file will often be preferred for certain purposes, such as due to its higher resolution or definition, its selected editorial or artistic content, and so forth. The technique is thus significantly different from one in which the IV data alone is processed and presented for distribution to audiences.

It should be noted that the technology disclosed here may be used for content that is stored for later distribution and viewing, or may be essentially "live". That is, pre-recorded content may be captured, edited, processed, post-processed, and prepared in many ways, and then stored for distribution. In other applications, "live" shows may use the same techniques (similar to conventional live television broadcasts). In such contexts, some storage and delay may be used as well. Similarly, as discussed below, audiences may store, time-shift, pause, and otherwise manipulate the content in ways similar to conventional broadcast, satellite, cable, and other contexts. Moreover, file formats may encapsulate not only different files (e.g., video, IV, etc.), but any temporal and spatial links between and among the standard video and IV content. Such links or cues will likely be established by one or more of the blending techniques discussed below.

The blended content is stored and/or distributed by a content distribution system or network 34. The present techniques allow for a very wide range of scenarios in this regard. That is, the content may be processed and distributed together as a single stream or file, such as by satellite, airway broadcast, cable transmission, and so forth. The content may, however, be transmitted separately such that the standard video and IV views may be sent via the same channel or different channels. That is, the standard video could by transmitted by broadcast media, satellite or cable, while the IV views may be transmitted via an Internet site or other technology. The distribution may also include various supports, such as disks, solid state memory, storage or memory systems, both remote from and local to a playback system. As also discussed below, at least some of the distribution and blending processing may be performed in different orders, with distribution occurring at least partially before blending, or vice versa, or through some degree of distributed processing.

Ultimately, the content is distributed to an audience and the audience experience is based upon an audience playback system as indicated by reference numeral 36. The distribution, in whatever form it takes, will allow for the audience playback system to display the principle view, in many cases as the preferred or default view, while allowing the audience or an audience member 38 to select immersive views when available. The audience playback system may include, for example, conventional theater screens and projection devices, television sets, computers, personal communication devices, such as telephones, tablet computers, wearable display devices such as goggles, glasses, heads-up displays, etc., or any other suitable device. The audience may command different immersive views to be displayed by interaction with the device. Presently contemplated technologies for such interaction may include conventional range camera systems, remote controls, games controls, hand-held devices such as cellular telephones, and any other suitable user feedback mechanism. Keyboards, cursors, accelerometers, and so forth may also be employed for this purpose. In some applications the audience playback system itself may be moved to provide the audience input of the desired views, such as by altering the position of a hand-held device including a viewer.

Figure 2:
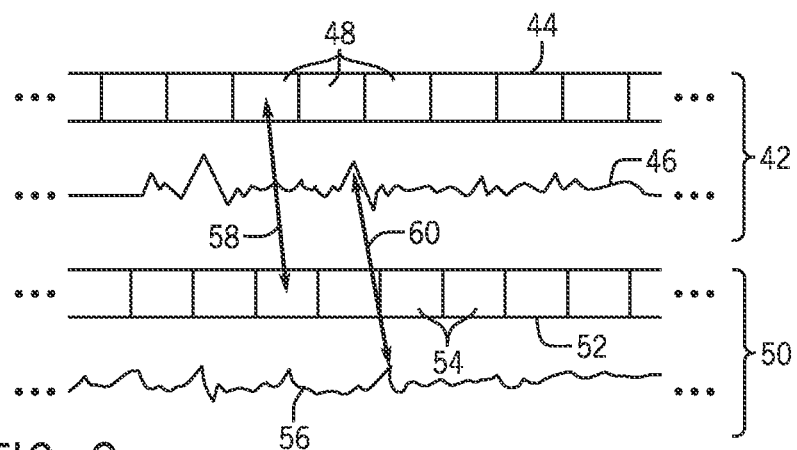
FIG. 2 is a diagrammatical representation of how blending of the video views may be performed temporally.

As noted, the present techniques allow for combining or blending standard video views or data with IV views or data. The views are blended and synchronized or aligned both temporally and spatially to allow for virtually seamless movement between the standard video views and the IV views. FIG. 2 illustrates an exemplary process for temporal synchronization or alignment. As shown, standard video stream or data 42 may comprise video data 44 and audio data 46. The video data may be considered to comprise a plurality of sequential frames 48. As will be appreciated by those skilled in the art, depending upon the codec used to create the video data, these frames may be converted, interleaved, scanned, compressed, and otherwise processed in various manners. These are considered to be beyond the scope of the present disclosure, however. Similarly, the IV views or data 50 may be considered to comprise IV data 52 and audio data 54. The video data may be considered to be made up of frames 56 as with the standard video data stream. In typical cases, the audio data and video data of each set will already be synchronized or aligned, although adjustments, filtering and so forth may be made to improved such synchronization. It should also be known that the IV data and the standard video data may be encoded differently, may run at different rates, may include different formats, and so forth. Also, one or both of the standard and IV data sets may not include audio data.

Blending or combining the standard and IV data may be carried out in a variety of manners. For example, individual frames or portions of the data may be analyzed as indicated at reference numeral 58 in FIG. 2 to allow for adjustment (e.g., advancement or delay) of the data streams so as to allow for a virtually seamless transition between standard video and IV. Such alignment may take place based upon any available technology, such as fingerprinting. Fingerprinting of video is generally known in the art, and may comprise analysis of data making up the video (e.g., individual frames) to recognize scenes, objects, colors, features, and other characteristics of the video. Fingerprinting may result in a value that can be compared so as to recognize which portions of the standard and IV scenes correspond to one another. Other techniques may include examination analysis of time codes, or reference to any available data derived from the video data or metadata associated therewith. In general, data such as fingerprint data, reference code data, and so forth may, for the present purposes, be termed more generally "spatial image matching data". As indicated by reference numeral 60, a synchronization and alignment for blending may also be based upon audio data. Where available, the two sets of audio data may correspond in time such that alignment may be simplified by reference to this data. The blending and alignment temporally may thus rely upon audio data alone, video data alone, or a combination of these.

Figure 3:
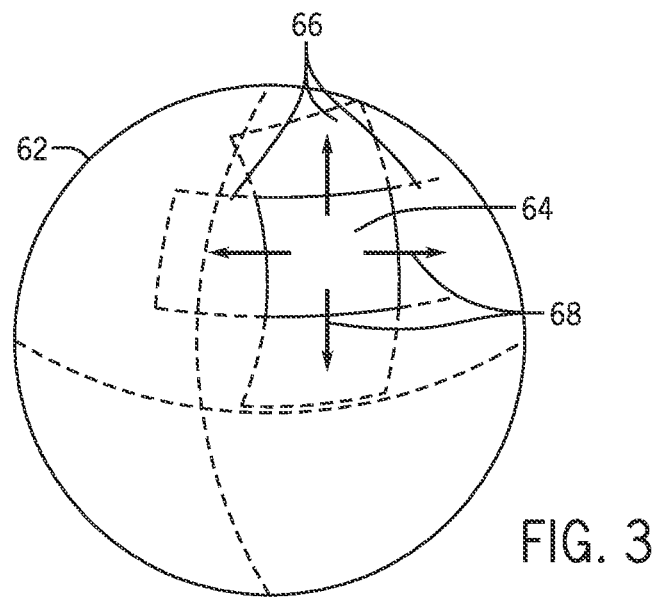
FIG. 3 is a diagrammatical representation of how the views may be aligned spatially.
Figure 4:
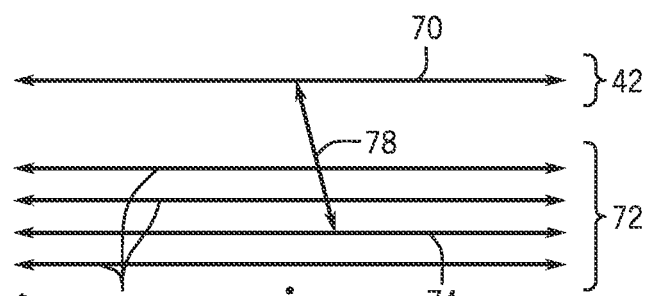
FIG. 4 is a diagrammatical representation of an exemplary manner of aligning the views temporally and spatially.

FIGS. 3 and 4 illustrate spatial blending, adjustment or alignment. In the illustration of FIG. 3, a fully surrounding scene 62 may be thought of as a sphere that is made up of adjacent blocks or fields. A principle view may correspond to one of these regions as indicated by reference numeral 64. This may be the view captured in the standard video view. Adjacent regions or views 68 proceed from this region and may at least partially complete all or part of the fully surrounding scene. Spatial alignment or blending may thus be made in order to allow for virtually seamless movement between the principle view or region 64 and other regions as indicated by arrows 68 in FIG. 3.

As illustrated in FIG. 4, the standard video stream or data 42 may comprise standard video data 70, which again may include both video and audio data. Spatially, however, multiple IV data sets 72 may correspond to video captured by the individual cameras of the IV camera. In general, one or a combination of these may correspond to the standard video view 70, as indicated by reference numeral 74. This may comprise a single view captured by the IV camera, or part of a view or a combination of overlapping or adjacent views captured by the cameras. By fingerprinting, or any desired image matching techniques known in the art, this particular region corresponding to stream 74 may be recognized and associated with the standard video data 70. This allows for identification of the data that should be considered as adjacent to or extraneous to the principle view that will typically be captured and retained from the standard video capture. Spatially, then, reference may be made to this additional data when an audience desires to move from the principle view to other views available from the IV data.

Figure 5:
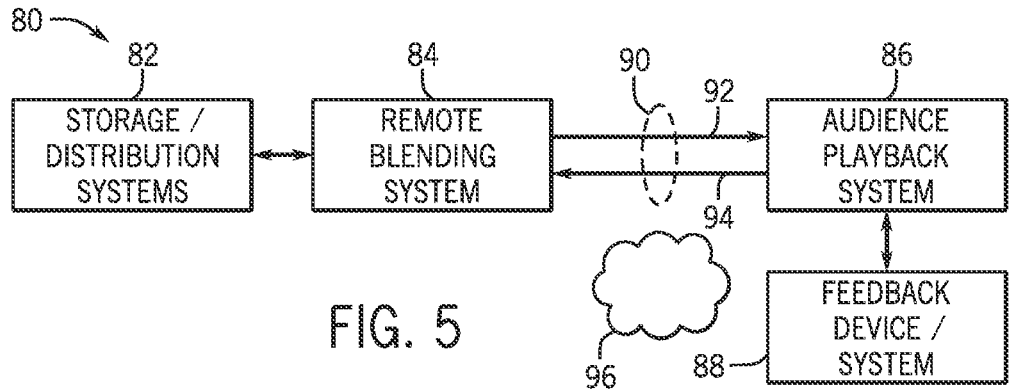
FIG. 5 is a diagrammatical representation of an exemplary implementation for blending standard and IV views.

A number of different scenarios are presently envisaged for the capture and storage of standard and IV data, for its blending, distribution and playback. Three such scenarios are illustrated diagrammatically in FIGS. 5, 6 and 7. As illustrated in FIG. 5, a first system 80 may comprise storage and distribution systems 82 that receive both standard video data and IV data comprising desired content. The storage and distribution systems may include circuits and equipment for processing, post-processing, and so forth, and ultimately will store data that is intended to be combined, blended and distributed for consumption by an audience. In this embodiment, a remote blending system 84 will comprise one or more processors, associated memory, and a configuration programming to allow for the temporal and spatial blending discussed above. The blending system is referred to as remote because it will typically be remote from an audience playback system 86. In this case, the audience playback system 86 may comprise any presently available or future playback system, such as projection systems, televisions, computers, hand-held devices, tablets, wearable devices, goggles, glasses, heads-up displays and so forth. Thus, audience playback system 86 need not perform blending functions. One or more feedback devices or systems 88 will typically be coupled to the audience playback system to allow for selection of desired views, including a principle view offered by the standard video data, and surrounding views offered by the IV data. Here again, these feedback devices or systems may include range cameras and other detection devices that detect movement or desires of the audience members, hand-held devices, or the playback system itself, which may include accelerometers, position detectors and so forth to provide the desired feedback. The content is typically received by a network 90 as indicated by reference numeral 92, while feedback to the remote blending system is provided in parallel as indicated by reference numeral 94. As noted above, these channels may be the same or entirely different. That is, the content may be transmitted and received by broadcast media, satellite, cable or by any other available media. The feedback may be provided by the same channels, parallel channels, or by an entirely different media (e.g., the Internet). One or both of these channels may pass through cloud services 96 which may assist in storing, blending, distributing, and so forth.

Figure 6:
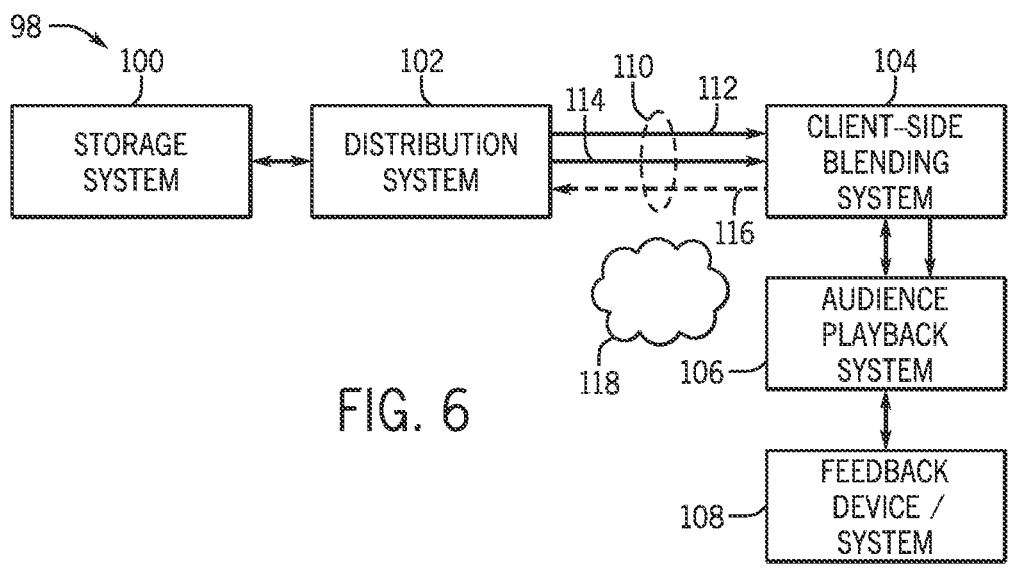
FIG. 6 is a similar diagrammatical representation of an alternative technique for blending the video views.

In the alternative system 98 of FIG. 6, a storage system 100 allows for storage of the standard video data and the IV data which, here again, will typically be processed, post-processed, and prepared for distribution. The distribution system 102 then allows for dissemination of this content, such as by broadcast, satellite, cable, or any other desired technique. Here, however, at least some client-side blending is performed as indicated by the system 104. Such blending may occur, for example, on a recipient computer, a set-top box, a television or other device that is equipped with one or more processors, associated memory, and software programming to perform such blending. To facilitate the blending, the content of the standard and video views may be at least partially aligned or associated such that at least some of the processing is performed prior to distribution. Here again, the blended data is then provided to an audience playback system 106 for viewing. Similarly, a feedback device for system 108 allows for an audience selection of the desired view or views. As noted above, the content may be distributed, and where desired or needed feedback may be provided by a network 110. In a view of FIG. 6, the standard video data is provided in parallel and somewhat independently from the IV data as indicated by reference numerals 112 and 114, respectively. It should be appreciated, however, that these may be provided together, including over a single channel. The arrangement of FIG. 6 may alleviate the need for feedback to the distribution system for the selection of desired views. However, certain feedback or data exchange, such as requests for content, may occur, as indicated by reference numeral 116. Moreover, as with the arrangement of FIG. 5, one or more of the processes, data streams and feedback may pass through cloud services 118.

Figure 7:
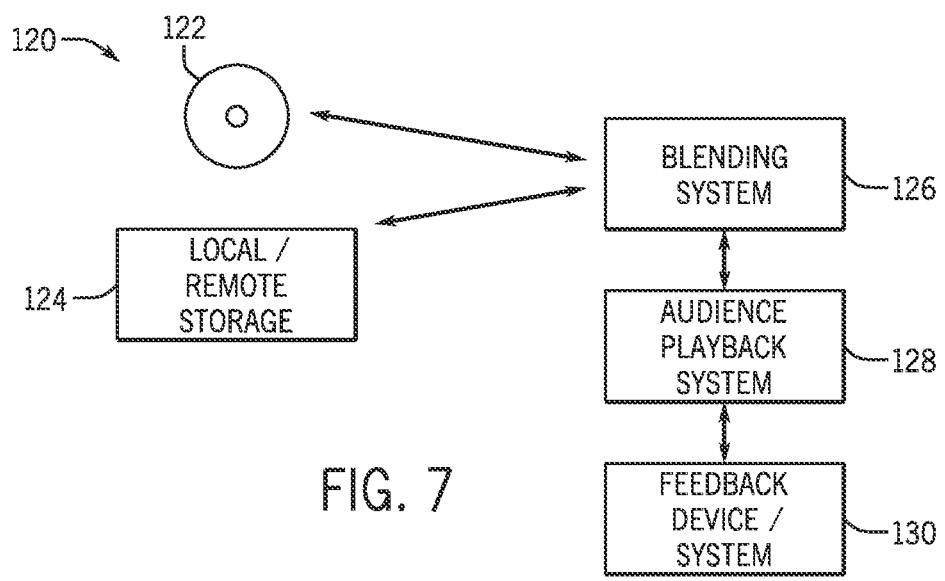
FIG. 7 is a similar diagrammatical representation of a technique for blending standard and IV views stored for viewing upon demand.

In the system 120 of FIG. 7, the standard and IV content (with any associated audio content) is stored for distribution. In this embodiment, the content is stored on a disk 122, or in local or remote storage 124. As will be appreciated by those skilled in the art, the content may be processed, post-processed, and will typically be ready for distribution on either the physical support 122 or storage 124. Various types of storage are well known in the art and available, such as systems for recording broadcasts, saving broadcasts, pausing and moving backward and forward through content, and so forth. Certain of these techniques may result from scheduled broadcasts, while others may be "on demand", such as via subscription, via the Internet, and so forth. Local or remote storage 124 is intended to cover any and all such scenarios. The content may be pre-blended, or may pass through a blending system 126 before playback on an audience playback system 128. Thus, the blending may be performed by an entity prior to distribution, with the playback system allowing for movement between the principle view and the surrounding views. In other scenarios, all of the data may be stored and available to the audience, with blending being performed, at least partially, locally where the content is played back. Here again, a feedback device or system 130 allows for audience interaction so as to select the principle view or any available surrounding views.

Figure 8:
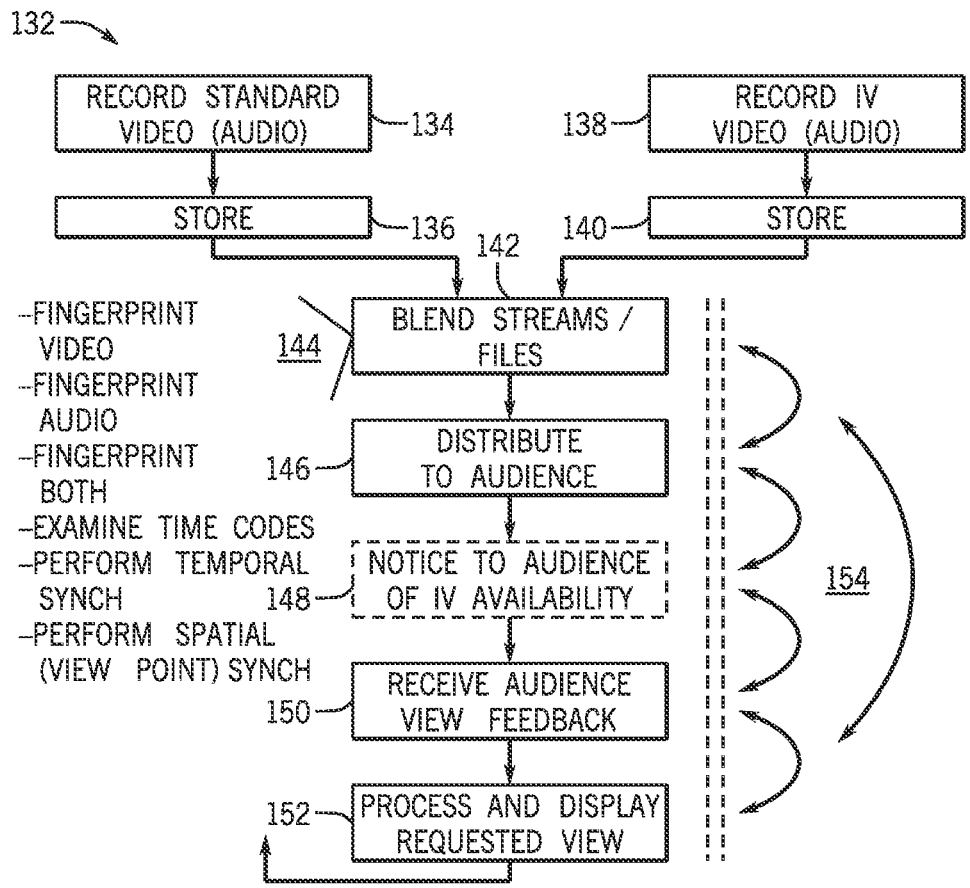
FIG. 8 is a flow chart illustrating exemplary logical steps for capturing, blending, distributing, and displaying video views.

FIG. 8 illustrates exemplary logic for carrying out the techniques described above. The process 132 will typically begin with recording standard video (and audio) as indicated by reference numeral 134, followed by storage of the video as indicated by step 136. It should be understood that recording and storage will typically include processing the video, selection of views, editing, post-processing, enhancement, combination with any other content (e.g., sound effects, special effects, etc.). Similarly, the process includes recording immersive video (and audio) data 138 along with its storage 140. Here again, these steps are intended to include any and all processing, enhancement, post-processing, and so forth. At step 142 the data streams or files are blended. As indicated by reference numeral 144, and as discussed above, techniques for blending may include fingerprinting video, fingerprinting audio, fingerprinting both video and audio, examination of time codes and/or metadata, and so forth. In general, these techniques will allow for performance of temporal synchronization of video and audio as well as spatial or viewpoint synchronization or alignment. The standard and IV data are distributed to an audience as indicated at reference numeral 146. Block 148 indicates notice to the audience that immersive video is available. The step is indicated as optional because in some embodiments IV views will always be available, at least at some degree. However, it is also contemplated that in some embodiments such scenes or views may be available only some times, or for certain portions of the content, and when available a notice may be conveyed (e.g., displayed on the playback device) indicating the availability of the surrounding views. As indicated at block 150, audience feedback may be received indicating a selection of the principle view of a surrounding view. Of course, in many applications, the principle view may be the default view, and this view is received and displayed until audience selections for alternative views are made and received as indicated at step 150. At step 152 the data is processed and displayed to provide the requested view. The arrow from block 152 is intended to indicate that this process is ongoing, and will typically be performed at a high cyclical rate, or upon receipt of a request for an alternative view from the audience.

As indicated by reference numeral 154 in FIG. 8, the foregoing logical steps may be changed in order, depending upon the particular scenario employed for blending, processing, storage and distribution. That is, as noted above, some or all blending may be performed before distribution, during distribution or after distribution, such as at least partially on audience systems. Similarly, feedback may be provided to allow for view processing prior to distribution, or such feedback may result in simple movement between views that have already been blended and processed (and distributed).

Figure 9:
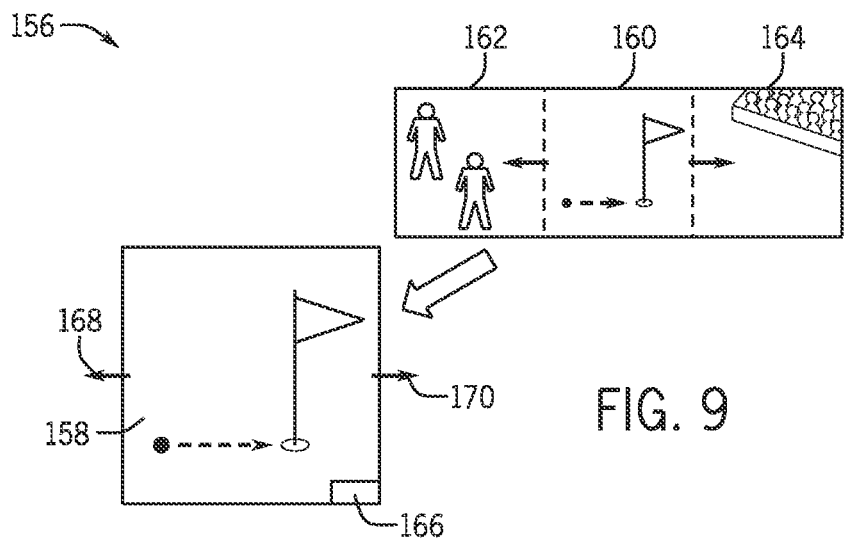
FIG. 9 is an illustration of a user experience, such as on a television or other audience playback device in accordance with the techniques.

The resulting experience may be one in which an audience can see and hear certain content but "move around" to different views other than the principle view when desired. The experience is illustrated diagrammatically in FIG. 9. In this example, the display 156 defaults to a principle view 158 (in this case a scene on a golf course). The principle view may correspond to a portion 160 of IV data with surrounding scenes 162 and 164 being available for selection. Indicia 166 may be provided in the display to indicate to the audience members that such surrounding views are currently available. When the audience member thus selects a surrounding view, the experience involves movement from the principle view corresponding to the standard video data to surrounding views as indicated by arrows 168 and 170. Here again, the principle view corresponding to the standard video data may be preferred as a default insomuch as this provides for higher resolution, more careful or desired editing, the subject matter for commentary, and so forth. The audience member may, however, select neighboring or surrounding views to "look around" although these views may be different in character from the principle view. While performing such excursions, both video scenes and audio data may be supplied that are different from the principle view. That is, conversations, surrounding sounds and the like may be provided instead of or along with audio of the principle view.

While only certain features of the invention have been illustrated and described herein, many modifications and changes will occur to those skilled in the art. It is, therefore, to be understood that the appended claims are intended to cover all such modifications and changes as fall within the true spirit of the invention. For example, while "standard" video content was discussed above, some or all of such content may be other than "live action" content captured from physical scenes with live actors. Instead, such video may include computer graphics, augmented reality views, animation, special effects, and so forth. The same is true of some or all of the IV content. Also, the standard video and/or the IV content may provide ideal platforms for graphic overlays, supplemental content, product placements, advertisements, "station bugs", and so forth.

Still further, while in some applications the standard and coordinated IV content may provide for display or playback of "standard views" almost entirely, except for certain scenes that are available for IV viewing, in other applications some scenes may be completely or almost completely IV. That is, in such scenes, the "standard view" may be a view selected within the IV sphere, with the audience being free to "roam" about to explore the surroundings. This may or may not require full blending of the entire content files, with limited temporal and spatial synchronization or alignment.

The invention claimed is:

1. A method comprising:
    accessing standard video content, comprising a standard video view comprising one or more primary content views of one or more scenes, without immersive video content comprising one or more corresponding immersive views that provide a panning effect enabling panning from the one or more primary content views to immersive views of the one or more scenes;
    accessing the immersive video content, comprising a corresponding immersive video view comprising the one or more corresponding immersive views that enable panning from the one or more primary content views of the one or more scenes to the immersive views of the one or more scenes, wherein the immersive video content is separate from the standard video content;
    displaying at least a portion of the standard video view at an audience playback system;
    determine whether an audience request to view at least a portion of the corresponding immersive video view is received during display of the at least portion of the standard video view;
    when the audience request is received during display of the standard video view, displaying the at least the portion of the corresponding immersive video view; and
    otherwise, when the audience request is not received during display of the standard video view, continue displaying the standard video view.

2. The method of claim 1, comprising blending the standard video view and the corresponding immersive video view.

3. The method of claim 2, wherein the standard video view and the corresponding immersive video view are blended prior to distribution to the audience playback system.

4. The method of claim 2, wherein the standard video view and the corresponding immersive video view are blended at least partially on the audience playback system.

5. The method of claim 1, wherein the audience request is made via a different data channel than a channel via which the standard video view and/or the corresponding immersive video view is conveyed to the audience playback system.

6. The method of claim 1, wherein the audience request is made via a hand-held audience feedback device or a motion sensor.

7. The method of claim 1, comprising:
    when displaying the at least the portion of the one or more primary content views, shifting audio playback from audio associated with the standard video view to audio associated with the at least portion of the corresponding immersive video view.

8. The method of claim 1, comprising displaying audience viewable indicia of availability of the corresponding immersive video view.

9. The method of claim 1, wherein the standard video view is displayed until an audience request is made to move from the standard video view to a neighboring or surrounding view of the one or more scenes that is not part of the standard video view, the neighboring or surrounding view of the one or more scenes being part of the corresponding immersive video view.

10. A method comprising:
    accessing standard video content, comprising a standard video view comprising one or more primary content views of one or more scenes, without immersive video content comprising one or more corresponding immersive views that provide a panning effect enabling panning from the one or more primary content views to immersive views of the one or more scenes;
    accessing the immersive video content, comprising a corresponding immersive video view comprising the one or more corresponding immersive views that enable panning from the one or more primary content views of the one or more scenes to the immersive views of the one or more scenes, wherein the immersive video content is separate from the standard video content;
    blending the standard video view and the corresponding immersive video view; and
    storing, distributing, and displaying the blended standard view and the corresponding immersive video views, such that:
    when an audience request to view at least a portion of the corresponding immersive video view is received during display of the standard video view, displaying the at least the portion of the corresponding immersive video view; and
    otherwise, when the audience request is not received during display of the standard video view, continue displaying the standard video view, without processing the corresponding immersive video view for display until the audience request is received.

11. The method of claim 10, wherein the standard video view and the corresponding immersive video view are blended by reference to image matching data derived from the standard video view and the corresponding immersive video view.

12. The method of claim 10, wherein the standard video view and the corresponding immersive video view are blended by reference to audio data from the standard video view and the corresponding immersive video view.

13. The method of claim 10, wherein the standard video view and the corresponding immersive video view are blended prior to distribution to an audience.

14. The method of claim 10, wherein the standard video view and the corresponding immersive video view are blended at least partially on an audience playback system.

15. The method of claim 10, wherein blending the standard video view and the corresponding immersive video view at least partially aligns the standard video view and the corresponding immersive video view temporally and spatially.

16. The method of claim 10, wherein blending the standard video view and the corresponding immersive video view at least partially aligns the standard video view and the corresponding immersive video view temporally and spatially via fingerprint data.

17. A system comprising:
- data storage storing standard video content, comprising:
  - a standard video view comprising one or more primary content views of one or more scenes, without immersive video content comprising one or more corresponding immersive views that provide a panning effect enabling panning from the one or more primary content views to immersive views of the one or more scenes; and
  - the immersive video content, comprising a corresponding immersive video view comprising the one or more corresponding immersive views that enable panning from the one or more primary content views of the one or more scenes to the immersive views of the one or more scenes, wherein the immersive video content is separate from the standard video content;
- a processing system configured to access the standard video view and the corresponding immersive video view, and to blend the standard video view and the corresponding immersive video view;
- a distribution system configured to distribute the standard video view and the corresponding immersive video view either before or after blending for viewing by an audience, such that:
- when an audience request to view at least a portion of the corresponding immersive video view is received during display of the standard video view, displaying the at least the portion of the corresponding immersive video view; and
- otherwise, when the audience request is not received during display of the standard video view, continue displaying the standard video view, without displaying the corresponding immersive video view until the audience request is received.

18. The system of claim 17, wherein the processing system is separate from an audience playback system on which the standard video view and the corresponding immersive video view are displayed.

19. The system of claim 17, wherein the processing system is at least partially part of an audience playback system on which the standard video view and the corresponding immersive video view are displayed.

20. The system of claim 17, wherein the processing system blends the standard video view and the corresponding immersive video view by reference to image matching data derived from the standard video view and the corresponding immersive video view.

21. The system of claim 17, wherein blending the standard video view and the corresponding immersive video view at least partially aligns the standard video view and the corresponding immersive video view temporally and spatially.

22. The system of claim 17, wherein blending the standard video view and the corresponding immersive video view at least partially aligns the standard video view and the corresponding immersive video view temporally and spatially via fingerprint data.

23. A tangible, non-transitory, machine-readable medium, comprising a video file comprising:
- a standard video component, sourced from standard video content, without immersive video content that comprises one or more corresponding immersive views that provide a panning effect enabling panning from a primary view to immersive views of one or more scenes of desired content, the standard video content comprising the primary view of the one or more scenes of the desired content that may to be rendered on an audience playback device;
- an immersive video component, sourced from the immersive video content that is separate from the standard video content, comprising the one or more corresponding immersive views of the one or more scenes enabling the panning from the primary view of the one or more scenes to the one or more corresponding immersive views of the one or more scenes, wherein the one or more corresponding immersive views comprise neighboring or surrounding view of the primary view; and
- association data between the standard video content and the immersive video content, such that:
- when an audience request to view at least a portion of the one or more corresponding immersive views is received during display of the primary view, displaying the at least the portion of the one or more corresponding immersive views; and
- otherwise, when the audience request is not received during display of the primary view, displaying the primary view.

24. The tangible, non-transitory, machine-readable medium of claim 23, wherein the video file comprises coded data sufficient to render the standard video component and the immersive video component on the audience playback device.

25. The tangible, non-transitory, machine-readable medium of claim 23, wherein the video file comprises synchronization data that coordinates at least one of temporal and spatial characteristics of the standard video component and the immersive video component.

26. The tangible, non-transitory, machine-readable medium of claim 23, wherein the video file comprises coded data that produces an audience perceptible indication that the one or more corresponding immersive views are available for viewing.

27. The tangible, non-transitory, machine-readable medium of claim 23, wherein the one or more corresponding immersive views are available for viewing for only a portion of the standard video component.

* * * * *